United States Patent [19]
Kuno et al.

[11] 4,212,074
[45] Jul. 8, 1980

[54] WEIGHT MEASURING METHOD AND APPARATUS THEREOF

[75] Inventors: Shiro Kuno; Yoshiharu Nishimura, both of Mishima, Japan

[73] Assignee: Tokyo Electric Co., Ltd., Tokyo, Japan

[21] Appl. No.: 927,938

[22] Filed: Jul. 25, 1978

[30] Foreign Application Priority Data

Jul. 29, 1977 [JP] Japan .................. 52-91966

[51] Int. Cl.² ............... G06F 9/16; G06F 15/20; G01G 7/00
[52] U.S. Cl. .................. 364/567; 364/466; 177/25
[58] Field of Search .............. 364/466, 567; 177/25

[56] References Cited

U.S. PATENT DOCUMENTS

| | | | |
|---|---|---|---|
| 3,725,656 | 4/1973 | Fukuma | 364/567 X |
| 3,984,667 | 10/1976 | Loshbough | 364/466 |
| 4,034,818 | 7/1977 | Matilainen | 364/466 X |
| 4,049,068 | 9/1977 | Kavanagh | 364/466 X |
| 4,055,753 | 10/1977 | Rogers et al. | 364/466 |

Primary Examiner—Edward J. Wise
Attorney, Agent, or Firm—Frishauf, Holtz, Goodman & Woodward

[57] ABSTRACT

A weight measuring apparatus comprises a load cell for generating an analog signal corresponding to load applied, and A/D converter for converting an output signal from the load cell into a digital signal, a data processing unit which periodically reads a digital output signal out from the A/D converter to successively write the digital output signal into a first memory area of the memory and produces data corresponding to the weight of load applied to the load cell on the basis of plurality of digital data stored in the first memory area of the memory to write the data into a second memory area of the memory, and a display unit for displaying the data from the data processing unit.

The data processing unit compares a plurality of digital data stored in the first memory area. As a result of the comparison, when a given number of or more digital data having the same values are included in the digital data stored in the first memory area, the digital data is produced as output data. On the other hand, when the digital data having the same values fail to reach the given number, the digital data stored in the second memory area and the latest or newest one of the digital data read out from the A/D converter are compared. When the difference between the two compared digital data exceeds a given value, the latest digital data is produced as output data. When, on the other hand, the difference is less than the given value, the data stored in the second memory area is read out and outputted.

21 Claims, 12 Drawing Figures

| H\M\L | F | E | --- | 6 | 5 | 4 | 3 | 2 | 1 | 0 |
|---|---|---|---|---|---|---|---|---|---|---|
| 0 | 0 | | | | | | | | | |
| | 1 | | | | | | | | | |
| | 2 | | | TARE | | | "ZERO WEIGHT" COUNT | | | |
| | 3 | | | NET WEIGHT | | | UNIT PRICE | | | |
| | 4 | | | ROUNDED NET WEIGHT | | | TOTAL PRICE | | | |
| | 5 | | | | | | ELEVENTH MEMORY AREA | | | |
| | 6 | | | | | F1 | TENTH MEMORY AREA | | | |
| | 7 | | | | | F2 | NINTH MEMORY AREA | | | |
| | 8 | | | | | N1 | FIRST MEMORY AREA | | | |
| | 9 | | | | | N2 | SECOND MEMORY AREA | | | |
| | A | | | | | N3 | THIRD MEMORY AREA | | | |
| | B | | | | | N4 | FOURTH MEMORY AREA | | | |
| | C | | | | | N5 | FIFTH MEMORY AREA | | | |
| | D | | | | | N6 | SIXTH MEMORY AREA | | | |
| | E | | | | | | SEVENTH MEMORY AREA | | | |
| | F | | | | | | EIGHTH MEMORY AREA | | | |

WEIGHT MEASURING METHOD AND APPARATUS THEREOF

BACKGROUND OF THE INVENTION

The invention relates to a weight measuring method and apparatus thereof.

An electronic weight measuring apparatus is known which includes a load cell generating an analog signal corresponding to the weight of load, a filter for removing an AC component of an output signal of the load cell, an amplifier for amplifying an analog output signal of the filter, an analog to digital converter for converting an analog signal supplied through the amplifier into a digital signal, a memory for storing digital data from the A/D converter, a data processor for producing weight information corresponding to the weight of load applied to the load cell on the basis of the digital data stored in the memory, and a display device for displaying the weight information from the data processor. The output voltage of the load cell used as a weight sensor is very small, i.e. several $\mu V$, and a mechanical damper for absorbing vibration can not be adapted for it. Therefore, the load cell is sensitive for extremely small vibration and is easily affected by noise, thus leading to instable display.

A digital type electronic weight measuring apparatus commercially available has a measuring range from 10 kg to 30 kg, for example, with a scale of 5 g divisions. In the weight measuring apparatus, when the weight of load to be measured is 502.5 g, for example, its display instably fluctuates between 500 g and 505 g.

In order to prevent such a fluctuation of display, the digital data from the A/D converter is sampled, and the way of variation in values of three digital data sampled continuously is observed to select a proper digital data from the three. However, this method fails to substantially eliminate the effect of noise signals and to provide sufficiently high reliable digital data.

SUMMARY OF THE INVENTION

Accordingly, an object of the invention is to provide a weight measuring method and apparatus thereof which minimizes adverse effect by noise and is capable of digitally displaying weight stably and reliably.

According to one aspect of the invention, there is provided weight measuring method comprising: a step of taking out a digital signal corresponding to the weight of load to be measured; a step for successively reading out the digital signal and writing the same into a first memory; a step of writing the digital data having the same value into a second memory when it is detected that a given number of or more digital data have the same values in the digital data stored in the first memory; a step of writing the latest data of the digital data stored in the first memory into the second memory when the number of digital data having the same values is smaller than the given number, and a step of taking out the digital data stored in said second memory as weight display information.

According to another aspect of the invention, there is provided a weight measuring apparatus comprising; a weight detecting means for producing digital signals corresponding to load; memory means including first and second memory sections; and a data processing means which reads the digital signals out from the weight detecting means at different timings to successively write the same into the first memory section of the memory means, compares a plurality of digital data stored in the first memory section with one another, writes one of digital data having the same value when it is detected from the result of comparison that a predetermined number of or more digital data have the same value, writes the newest one of the digital data stored in the first memory section into the second memory section when it is detected from the result of comparison that less than the predetermined number of digital data have the same value, and then produces the digital data stored in the second memory section as weight display information.

Other objects and features will be apparent from the following description in connection with the accompanying drawings, in which:

DESCRIPTION OF THE PREFERRED EMBODIMENTS

Figure 1:
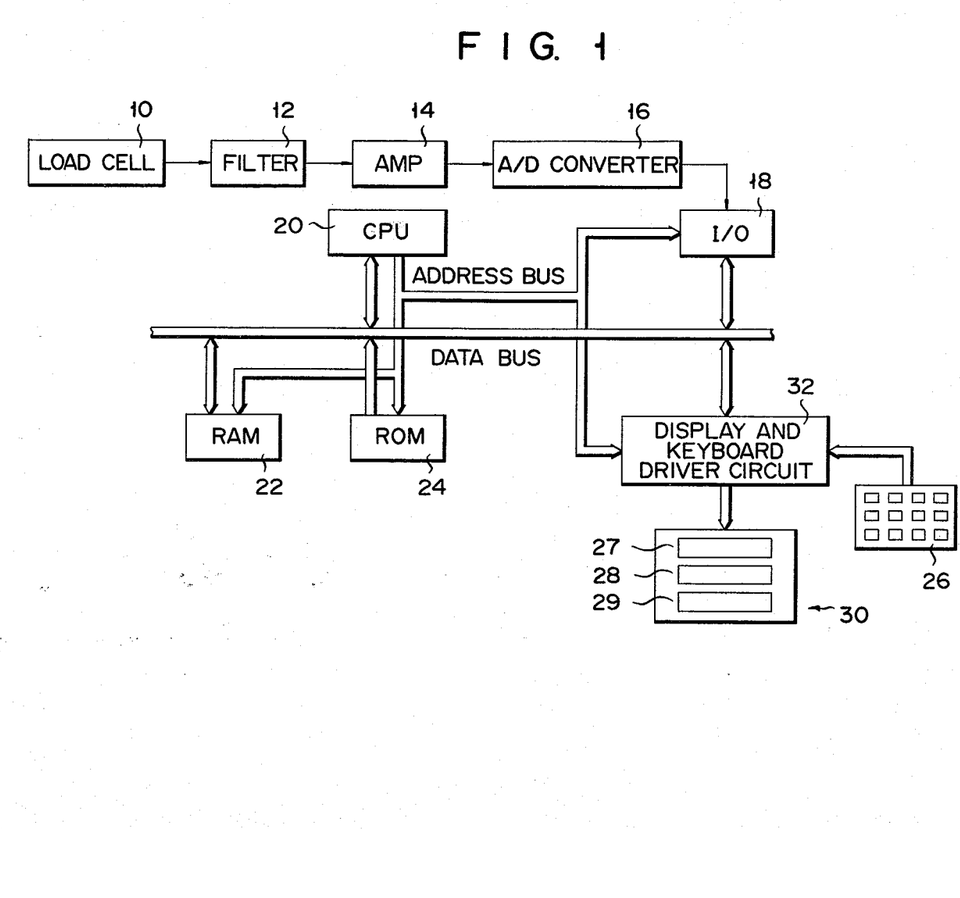
FIG. 1 shows a block diagram of an embodiment of a weight measuring apparatus according to the invention.

Referring first to FIG. 1, there is shown a weight measuring apparatus according to an embodiment of the invention. The weight measuring apparatus is provided with a load cell 10 as a weight sensor which responds to the weight of load ranging from 0 to 15 kg, for example, to produce an output voltage changing several $\mu V$ for every 5 g change of the weight of load, i.e. for every division of the scale. The high frequency component of the output voltage of the load cell 10 is removed by a low-pass filter 12 and then the output signal of the filter 12 is amplified by an amplifier 14 with approximately 60 dB of the amplication factor. The analog signal delivered through the amplifier 14 is applied to a dual slope type A/D converter 16 where it is converted into a digital signal or a count signal. In the example, the A/D converter 16 is so designed to produce a count output signal whose content is changed by the counts for variation in voltage signal delivered through the amplifier 14 and corresponding to a 5 g change of the weight of load. Therefore, when the load of 15 kg is applied to the load cell 10, a count signal of 30000 counts is produced from the A/D converter 16.

The digital data delivered to an I/O unit 18 is read out from the I/O unit when it is designated by a central processing unit (CPU) 20 and then is written into a random access memory (RAM) 22 to be described later. The CPU 20 operates in accordance with a program stored in a read only memory (ROM) 24 which program corresponds to, for example, the flow charts shown in FIGS. 2 and 4. These CPU 20, RAM 22 and ROM 24 may be constructed by a Model μCOM-4 miniature computer sold by Nihon Electric Company Ltd. (NEC), for example. That is, in this example, CPU 20, RAM 22, ROM 24 and I/O unit 18 are constructed by semiconductor circuits μPD751D, μPD412D, μPD446D and μPD752D sold by the same company, respectively.

The weight measuring apparatus is further comprised of a key-board including entry keys for providing unit costs, a tare key, and a clear key, a dynamic display section 30 including a unit price display section 27, a weight display section 28 and an amount display section 29, and a display/keyboard driver circuit 32 for driving the keyboard 26 and the display unit 30.

Figure 2:
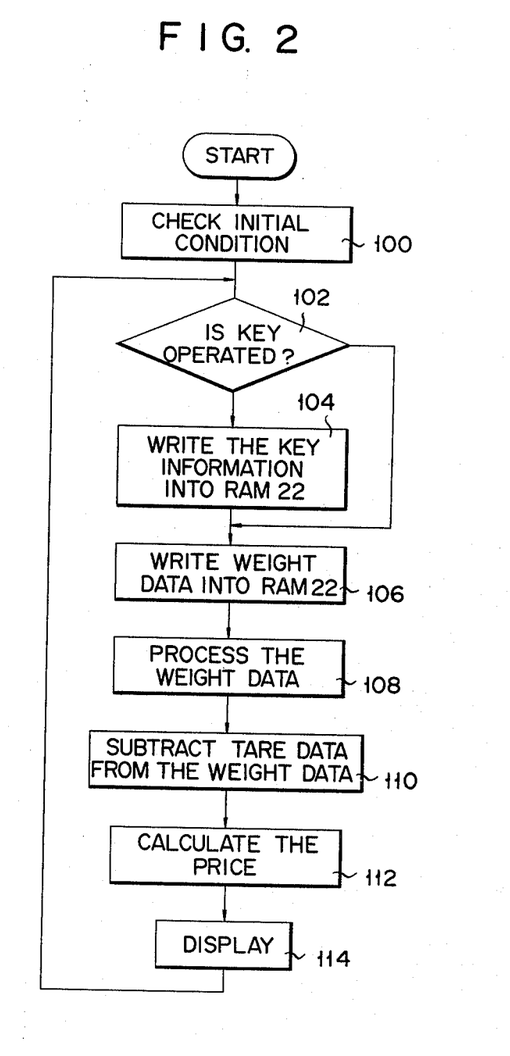
FIG. 2 shows a flow chart for illustrating an operation of the weight measuring apparatus shown in FIG. 1.

The operation of the weight measuring apparatus shown in FIG. 1 will be described with reference to a flow chart shown in FIG. 2.

Upon turning-on of a power switch (not shown), in step 100, the CPU 20 energizes successively the digits in the display sections 27 to 29 of the display section 30 to check that the display section 30 normally operates. Then, in step 102, the CPU sends an address signal to a driver circuit 32 to check if key operation is made on the keyboard 26 or not. In this step, when it is confirmed that the key operation is conducted, in a succeeding step 104, key information corresponding to the key operation is written into the RAM 22. When the entry key, for example, is operated, unit price information is written into a unit price memory area of RAM 22 as described later. When the tare key is operated, tare information is written into a tare memory area. When the clear key is operated, a unit price/tare memory area is cleared.

In step 106, the CPU 20 delivers an address signal to the I/O unit 18 and transfers weight data fed from the A/D converter 16 to the I/O unit 18 into the first weight data memory area of the RAM 22. The weight data stored in the weight data memory area of the RAM 22 is processed in step 108 and reliable data is selected from the weight data and then is written into another weight data memory area of the RAM 22. Then, in step 110, the tare data obtained in the step 100 is subtracted from the weight data gained in the step 108 so that net weight data is produced, and then is written into a net weight data memory data. The net weight data is rounded and then in step 112 is processed together with the unit price data which has been written into the RAM 22 in the step 100, so that an amount of money is calculated and the amount data is written into the amount data memory area. In a step 114, the unit price data stored in the RAM 22, the net weight data rounded and the total price data are displayed in the display 30.

Following this, the operation of the CPU 20 returns to the step 102 and the just-mentioned operation will be repeated.

Figure 3:
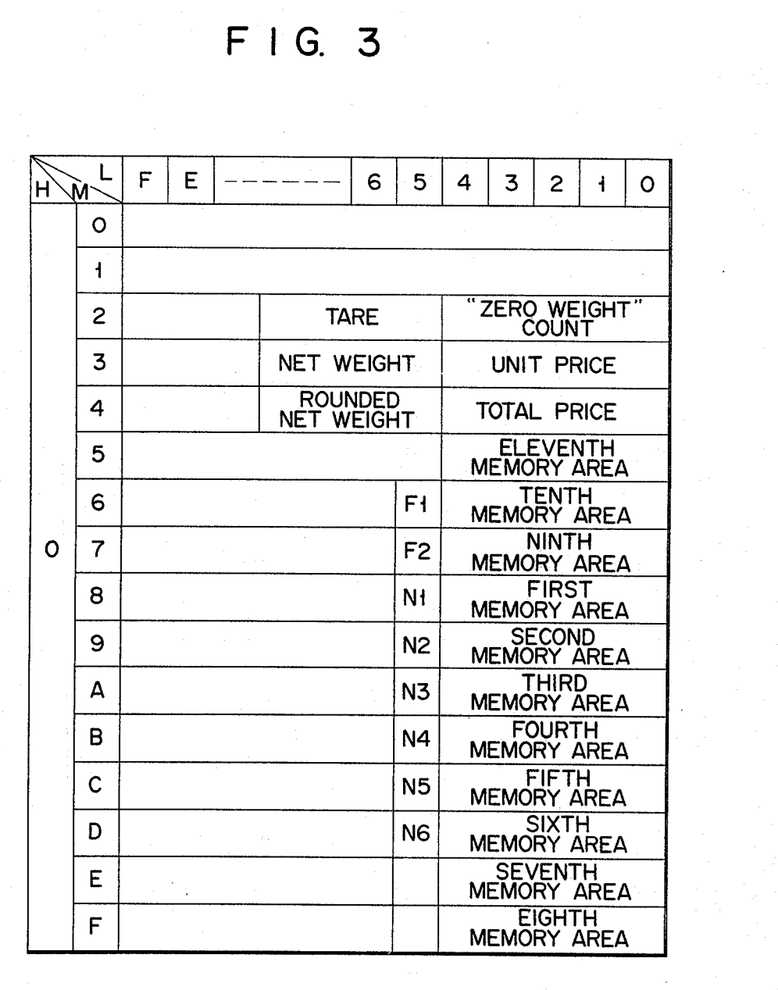
FIG. 3 shows a memory map of a random access memory used in the weight measuring apparatus shown in FIG. 1.

The RAM 22 used in this example has a memory capacity of 4×256 bits and its memory map is shown in FIG. 3. In the memory map, characters H, M and L designate the most significant digit, the middle significant digit and the least significant digit of an address designated by hexadecimal three digits. The newest weight data obtained in the step 106 is written into a first memory area designated by addresses "080" to "084". The weight data read out prior to the newest weight data are successively written into the second to eighth memory areas with the oldest weight data stored in the eighth memory area.

Stored in the memory area $N_1$ designated by "085" address is a numeral equal to the sum of one and the number of weight data stored in the second to eight memory areas which have the same value as the firsth memory area. For example, when the weight data in the second, third, fifth and seventh memory areas are equal to the weight data in the first memory area, written into the memory area $N_1$ is a numeral 5. Similarly, written into the memory area $N_2$ specified by the address "095" is a numeral with 1 added of the number of those weight data stored in the third to eighth memory areas which are equal to the weight data stored in the second memory area. Similarly, written into each of the memory areas $N_3$ to $N_6$ specified by addresses "095" to "0D5" is a numeral with one added of the number of those weight data in the memory areas which are older than and equal to the weight data of the corresponding memory area. If the weight data stored in the first to eighth data are all equal, into the memory areas $N_1$ to $N_6$ are loaded numerals 8 to 3, respectively.

When any one of the numeral data stored in the memory areas $N_1$ to $N_6$ is greater than a given value, e.g. 5, the weight data having the same value is written into the ninth memory area specified by address "070" to "074". On the other hand, when the numerals stored in the memory areas $N_1$ to $N_6$ are all less than a given value, the weight data stored in the first memory area is written into the tenth memory area specified by addresses "060" to "064". The addresses "065" and "075" specify flags F1 and F2. Written into the eleventh memory area specified by addresses "050" to "054" is data representing a difference between the weight data stored in the ninth and tenth memory areas when the numerals stored in the memory areas $N_1$ to $N_6$ are all less than a given value N.

A reference count obtained when no load is applied onto the load cell 10 is stored into the "zero weight" count memory area specified by addresses "020" to "024". The reference count stored is checked at each process of the process cycle in FIG. 2 and is rewritten only when a difference between the reference count value and the preceding one is less than a given value. Written into the TARE memory area specified by the addresses "050" to "090" is the tare data obtained in the step 102. Written into the memory area designated by addresses "030" to "034" is the unit price data gained in the step 120. Into the net weight and rounded net weight memory areas designated by addresses "035" to "039" and "045" to "049" are written the net weight and the rounded net weight data gained in the step 110, respectively. Written into the total price memory area designated by addresses "040" to "044" are the total price data gained in the step 112.

Figure 4:
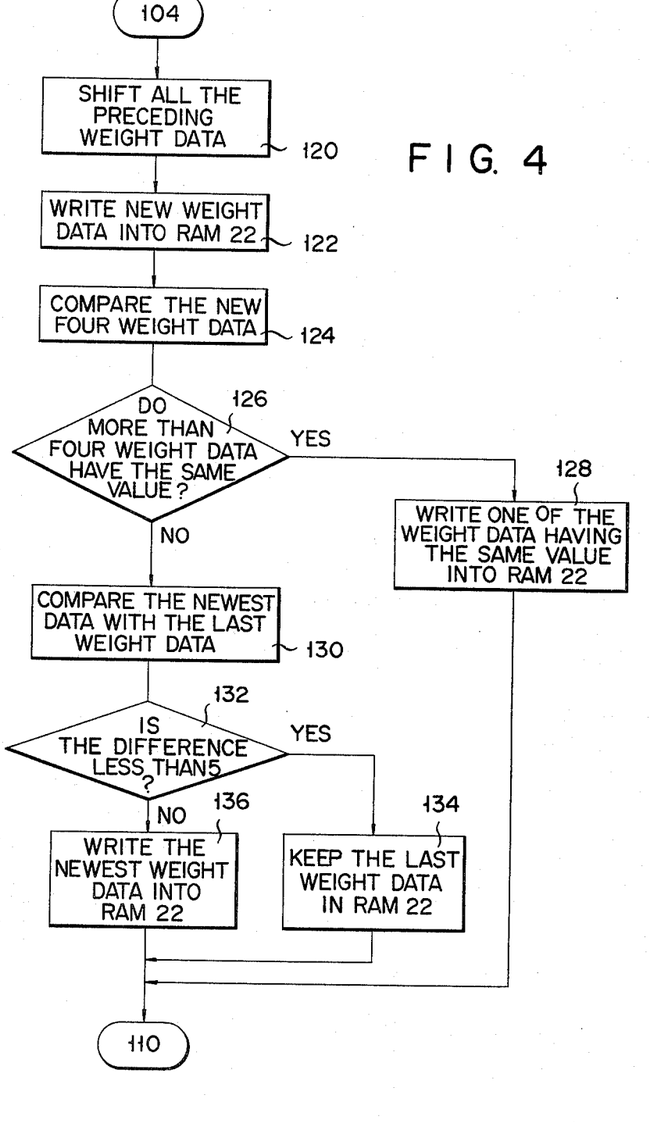
FIG. 4 shows a flow chart for illustrating in detail a part of the data processing flow shown in FIG. 2.

The details of the steps 106 and 108 in FIG. 2 will be given with reference to FIG. 4. In FIG. 4, steps 120 and 122 correspond to the step 106 in FIG. 2 and steps 124 to 136 correspond to the step 108.

Following the step 104, the CPU 20 shifts, in the step 120, the weight data stored in the first to seventh memory areas in the RAM 22 into the second to eighth memory areas and transfers, in the step 122, the weight data newly read out from the A/D converter 160 into the first memory area of the RAM 22. In the step 124, it compares four new weight data stored in the first to fourth memory areas with other weight data. In more particular, the weight data in the first memory area is compared with the weight data stored in the second to eighth memory areas and then the weight data in the second, third and fourth memory areas are successively compared with the weight data in the third to eighth, fourth to eighth, and fifth to eighth memory areas, respectively. The result of the comparisons are detected in the step 126 and it is checked whether five or more weight data in the weight data stored in the first to eighth memory areas have the same value or not. When the five to more weight data have the same value, one of the weight data having the same values is written as effective data into the ninth memory area of the RAM 22 while at the same time the flag F2 is raised. Then, the step 110 is executed on the basis of the weight data stored in the ninth memory area.

On the other hand, when it is detected that more than four weight data having the same values do not exist, the CPU 20, in the step 130, compares the newest weight data stored in the first memory area of RAM 22 with the weight data stored in the ninth memory area and writes a difference between the compared weight data into the first memory area of RAM 22. In a step 132, it is checked whether the difference between them is less than five count or not. When the difference is less than five count, the last weight data stored in the ninth memory area is held therein as it is, as the effective weight data. At the same time, the corresponding flag F2 is raised or generated. Succeedingly, a step 110 is executed on the basis of the weight data stored in the ninth memory area.

When the difference of five or more count is detected, a step 136 reads out the newest weight data stored in the first memory area of RAM 22 and writes the read-out one as the effective weight data into the tenth memory area of RAM 22 while at the same time raises the corresponding flag F1. Upon completion of the step 136, the succeeding step 110 is executed on the basis of the weight data stored in the tenth memory area.

Figure 5A:
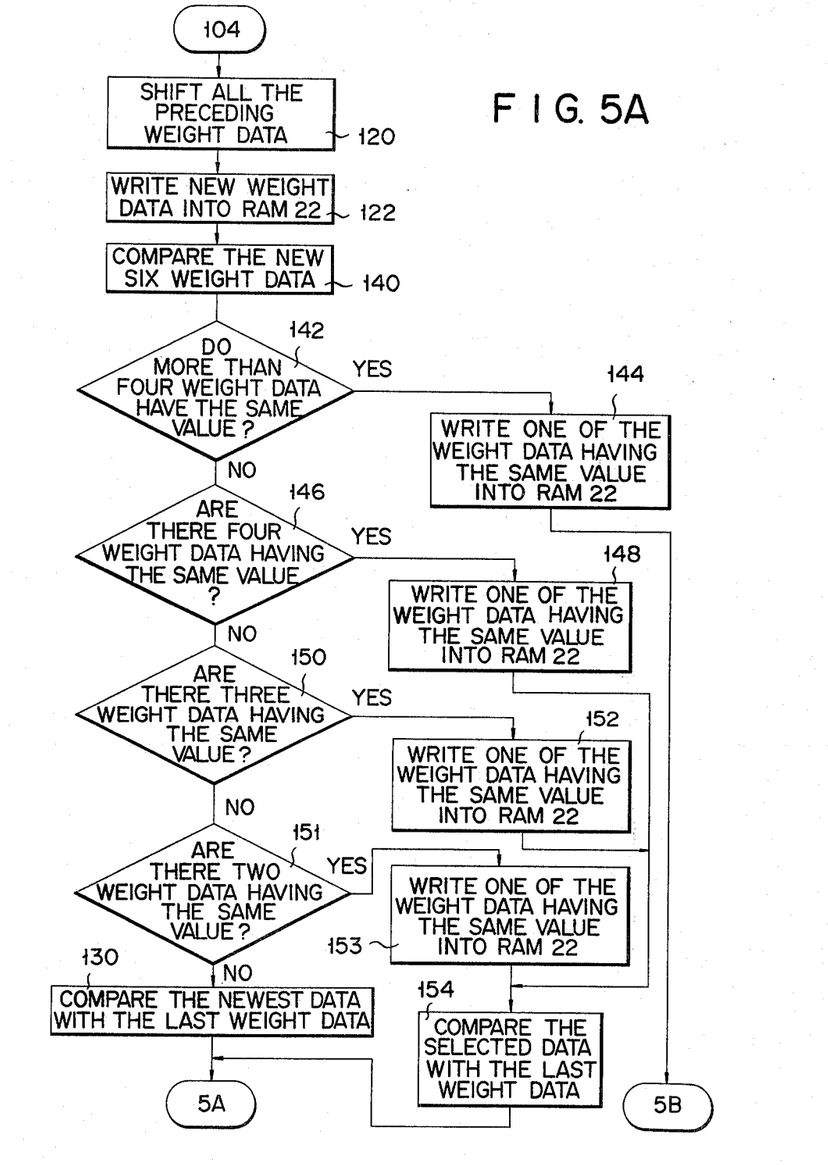
FIGS. 5 and 6 show modifications of the flow charts shown in FIG. 4.
Figure 5B:
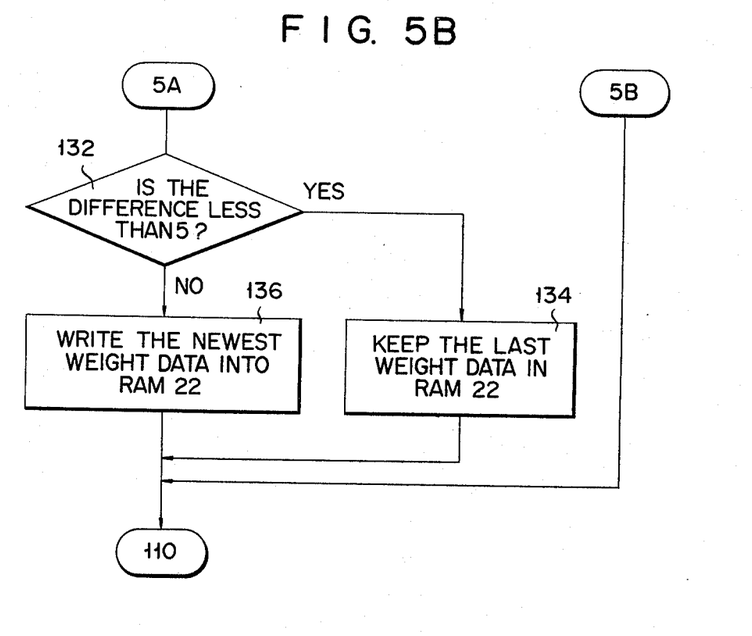

Referring now to FIG. 5, there is shown a flow chart of the weight measuring method of another embodiment according to the invention. In the figure, the data processing from step 104 to 122 and from step 130 to 110 almost the same as those shown in FIG. 4.

In a step 140, the individual weight data stored in the first to sixth memory areas of RAM 22 are compared with other weight data in a similar manner shown in FIG. 4. Upon detection of the result of the comparison, it is checked if five or more weight data stored in the first to eighth memory areas have equal values or not. When five or more weight data have equal values, a step 144 writes one of the weight data having the equal values as the effective weight data into the ninth memory area of RAM 22 while at the same time raises the flag F2.

In a step 142, when five or more weight data having the same values do not exist, a step 146 detects if there are four weight data having the same values or not. When there are four weight data having the same values, one of these weight data is written as the effective weight data into the tenth memory area of RAM 22 in a step 148. In this case, when there is another group of four weight data having the same values, that group of four weight data including the newest weight data is selected and one of the weight data of this group is written as the effective data into the tenth memory area.

When the step 146 fails to detect four weight data having the same values, a step 150 checks to see if three weight data have the same value or not. If three weight data have the same value, one of the weight data having the same value is written as the effective data into the tenth memory area of RAM 22 in a step 152. Also in this case, when there is another group of three weight data having the same value, one of three weight data of a group including the newer weight data is written as the effective weight data into the tenth memory area of RAM 22.

In a step 150, if it is found that three weight data have not the same values, a step 151 checks to see if there are two weight data having the same value. If two weight data have the same value, one of them is written as the effective data into the tenth memory area of RAM 22 in a step 152. Also in this case, where there is another group of two weight data having the same value, one of two weight data of that group including the newer weight data is written as the effective weight data into the tenth memory area of RAM 22. In a step 151, if it is found that there is no group of two weight data having the same value, the newest weight data stored in the first memory area of RAM 22 is compared with the weight data stored in the ninth memory area. The weight data stored in the tenth memory area of RAM 22 in steps 148 and 152 is compared with the weight data stored in the ninth memory area.

The weight measuring method of an additional embodiment according to the invention will be described with reference to FIG. 6.

In this instance, six out of eight sampled weight data are compared in a step 160. When it is detected in a step 162 that four or more of those eight sampled weight data have the same values, one of the sampled weight data having the same values is written into the ninth memory area of RAM 22 in a step 164, as in a similar manner of the step 144 in FIG. 5. In the step 162, when it is found that four or more sampled weight data have not the same values, a step 166 checks as to whether three weight data have the same values or not. If three weight data have the same values, one of the weight data having the same values is written into the tenth memory area of the RAM 22 in a step 168, as in a similar manner of the step 152 in FIG. 5.

When the step 166 detects that three weight data having the same values do not exist, a step 170 checks as to whether two sampled weight data having the same values exist or not. If it is found, as a result of the check, that two sampled weight data having the same values exist, one of the weight data having the same values is written into the tenth memory area of RAM 22 in a step 172. In this case, if there are two or more pairs of sampled weight data having the same value, the sampled weight data in the pair including newer sampled weight data is written into the tenth memory area of RAM 22. The weight data stored in the tenth memory area of RAM 22 in the steps 168 and 172 is compared with the weight data stored in the ninth memory area and then data processing will be further continued in a manner as shown in FIG. 4.

In a step 170, if it is found that none of the sampled weight data having the same value exists, a step 130 compares the weight data stored in the first memory area of RAM 22, i.e. the newest sampled weight data, with the weight data stored in the ninth memroy area. Then, data processing will be proceeded as shown in FIG. 4.

Figure 7:
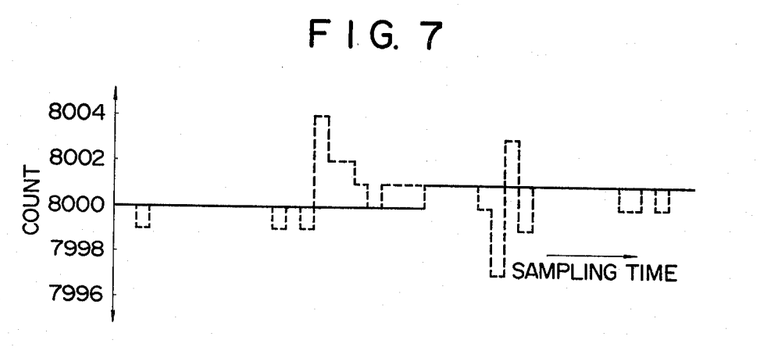
FIG. 7 shows a relationship between sampled weight data and effective weight data obtained by data processing through the flow chart in FIG. 7.

FIG. 7 illustrates a relationshop between the sampled data stored in the first to eighth memory areas of RAM 22 and the effective sampled weight data stored in the ninth to tenth memory areas in the embodiment shown in FIG. 5. In the figure, the sampled weight data is indicated by a broken line and the effective sampled weight data by a solid line. Count value corresponding to these weight data is plotted along a y coordinate axis and the sampling time along an x coordinate axis. As seen from the figure, even if the sampled weight data frequently varies, the effective sampled weight data exhibits little change.

Figure 8:
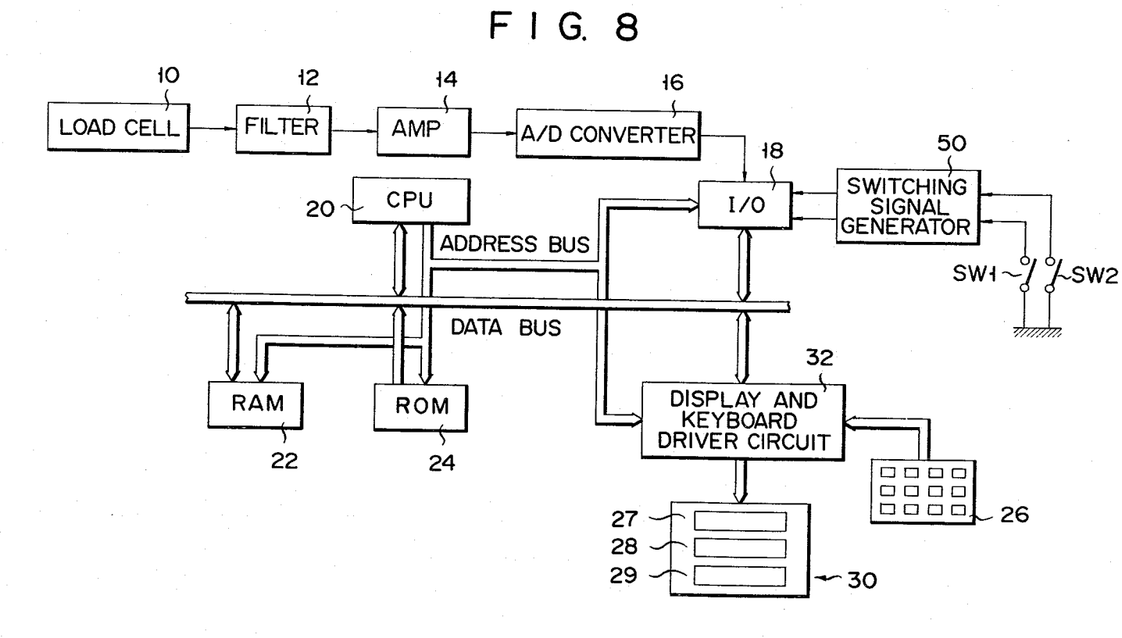
FIG. 8 shows a block diagram of another embodiment of the weight measuring apparatus according to the invention.

FIG. 8 shows a circuit construction of another embodiment of the weight measuring apparatus according to the invention. The circuit construction in this instance is the same as that of FIG. 1, except an additional provision of a switching signal generator 50 for supplying to the I/O unit 18 output signals indicating switching states of switches SW1 and SW2, and these switches as well.

Figure 9:
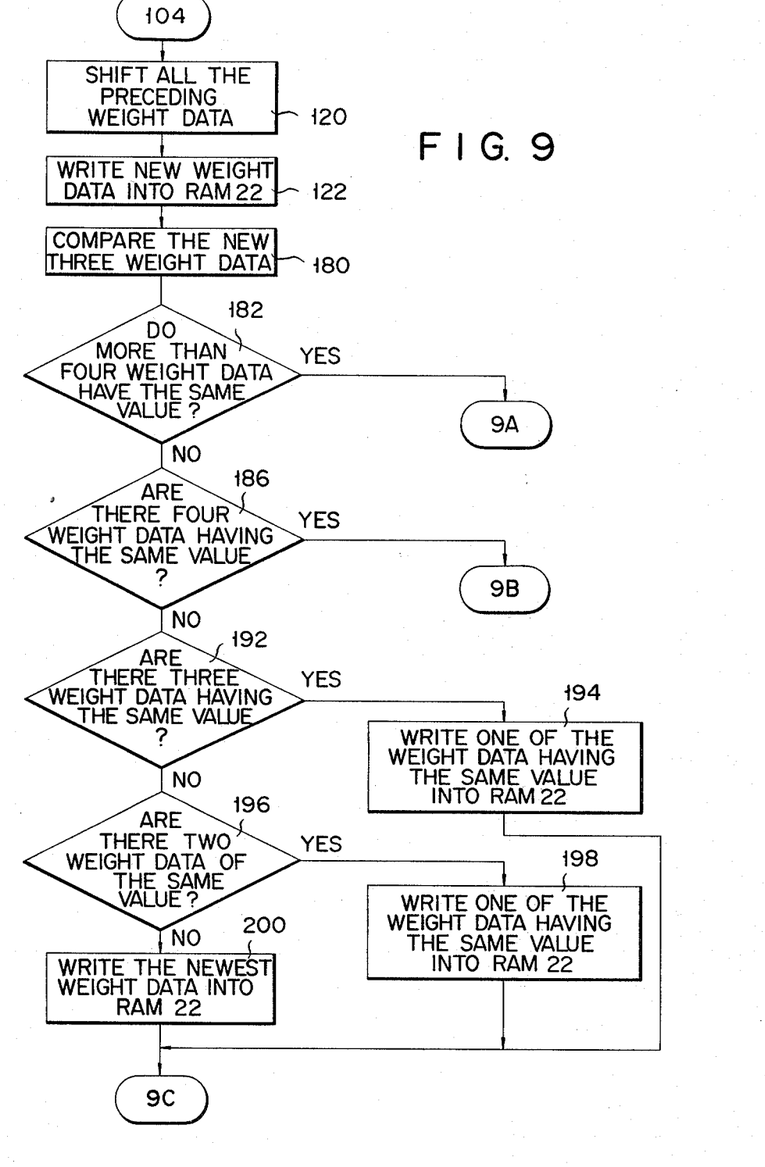
FIGS. 9 and 10 show flow charts for illustrating the operation of the weight measuring apparatus shown in FIG. 8.
Figure 10:
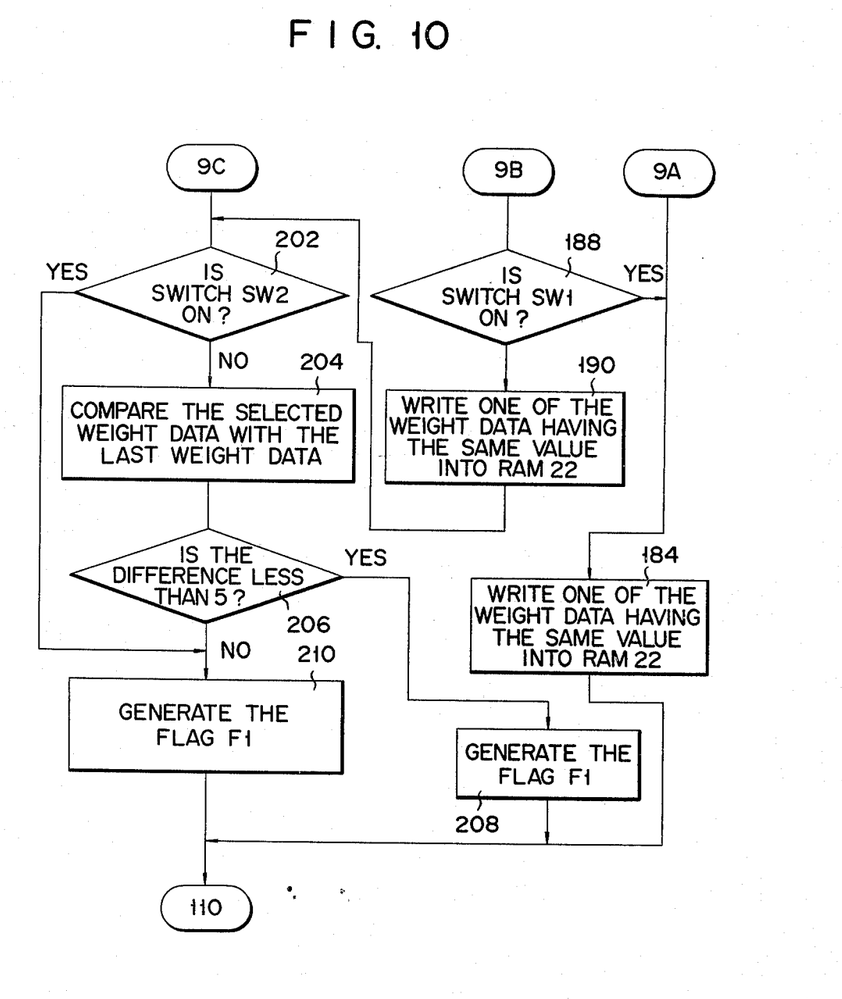

The operation of the weight measuring apparatus shown in FIG. 8 will be described with reference to FIGS. 9 and 10 illustrating a flow chart of the operation.

In FIG. 9, data process from the first step to step 122 is the same as that of the corresponding steps shown in FIG. 5. In FIG. 10, data process from step 132 to the last step is executed in the same manner as in the data process of the corresponding step shown in FIG. 5.

In a step 180, three out of eight sampled weight data are compared with other sampled weight data. As in the step 124 in FIG. 4, the sampled weight data with the same value are detected. If the result of comparison indicates that there are five or more sampled weight data with the same value in a step 182, one of these weight data is written into the ninth memory area of RAM 22 in a step 184 (FIG. 10).

On the other hand, when it is detected that five or more weight data having the same value do not exist, a step 186 checks to see if there are four sampled weight data having the same value or not. When it is found, as a result of the checking, that there are four sampled weight data of such type, a step 188 (FIG. 10) further checks to see if the switch SW1 is turned on or off. Here, if the switch SW1 is closed, in a step 184, one of the weight data having the same value is written into the ninth memory area of RAM 22. When the switch SW1 is turned off, in a step 90, one of the weight data with the same value into the tenth memory area of RAM 22. In this case, when there are two sets of four sampled weight data having the same values, the sampled weight data set having the newest one is used.

In the step 186, when it is detected that there are not four sampled weight data having the same value, a step 192 checks as to whether there are three sampled weight data having the same value or not. If it is found that three sampled weight data have the same values, one of the three sampled weight data is written into the tenth memory area of RAM 22 in a step 194. In this case, when there are two sets of three sampled weight data having the same values, that sampled weight data group including the newest sampled weight data is used.

On the other hand, when it is detected that there are not three sampled weight data of such type, a step 196 checks as to whether there are two sampled weight data having the same values or not. Here, if it is detected that the two sampled weight data exist, one of the sampled weight data having the same value is written into the tenth memory area of RAM 22 in a step 198. When there are two or more groups of two sampled weight data having the same values, one of the weight data of the sampled weight data group including newer sampled weight data is written into the tenth memory area of RAM 22.

When a step 196 fails to detect two sampled weight data having equal values, the newest weight data stored in the first memory area of RAM 22 is written into the tenth memory area of RAM 22 in a step 200. Then, in a step 202, it is checked as to whether the switch SW2 is closed or not. Where the switch SW2 is closed, the weight data written into the tenth memory area of RAM 22 in the step 190 or 200 is processed in a step 110. Where the switch SW2 is turned off, the weight data written into the tenth memory area of RAM 22 in the step 190 or 200 is compared with the weight data stored in the ninth memory area in a step 204. When the result of the comparison shows that the difference between the compared weight data is less than 5 count, the flag F2 of RAM 22 is raised or generated in a step 208 so that the weight data stored in the ninth memory area is processed in a step 110. Conversely, when the comparison result shows that the difference between them is 5 or more count, the flag F1 of RAM 22 is generated in a step 210 so that the weight data stored in the tenth memory area is processed in a step 110.

Figure 6:
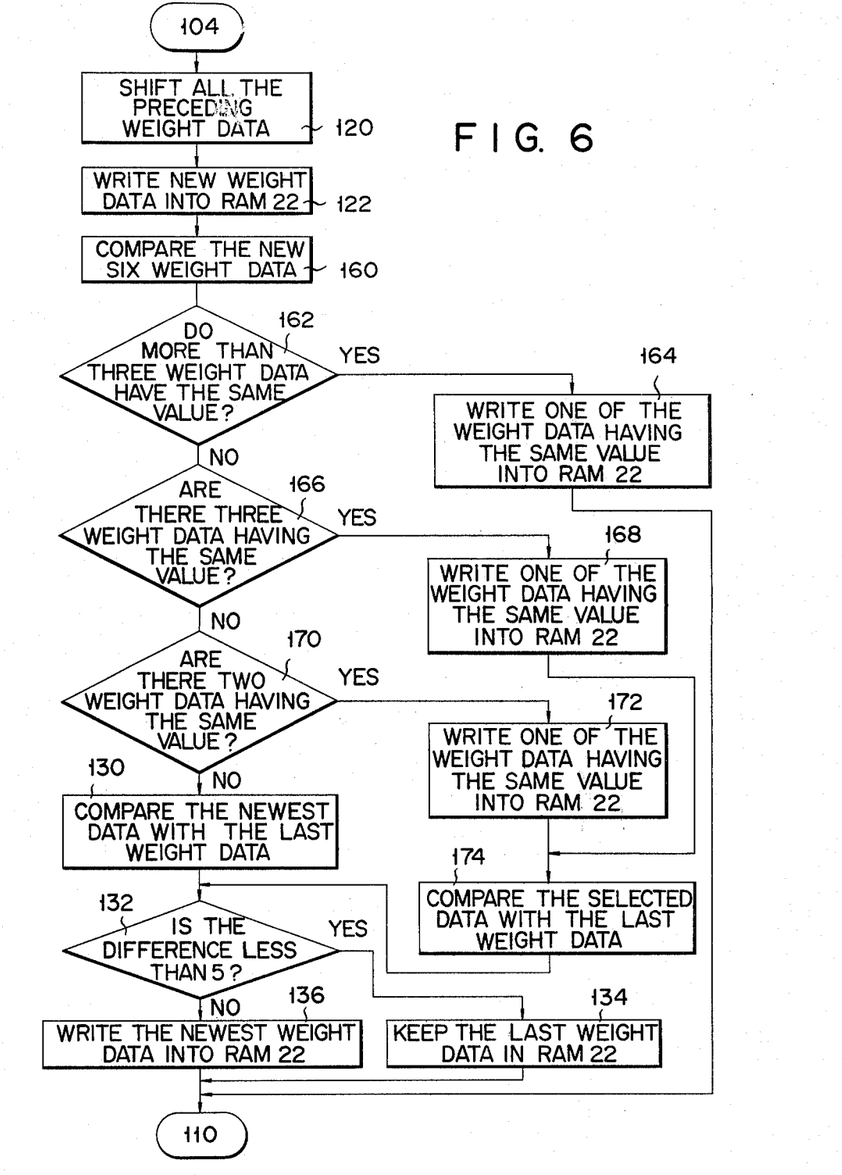

As seen from the foregoing, in the data process shown in FIGS. 9 and 10, a switching operation control of the switch SW1 permits data process shown in FIGS. 5 and 6 to be selected. A switching operation control also permits the weight data stored in the tenth memory area of RAM 22 to be directly used with omission of the steps 204 and 206.

Figure 11:
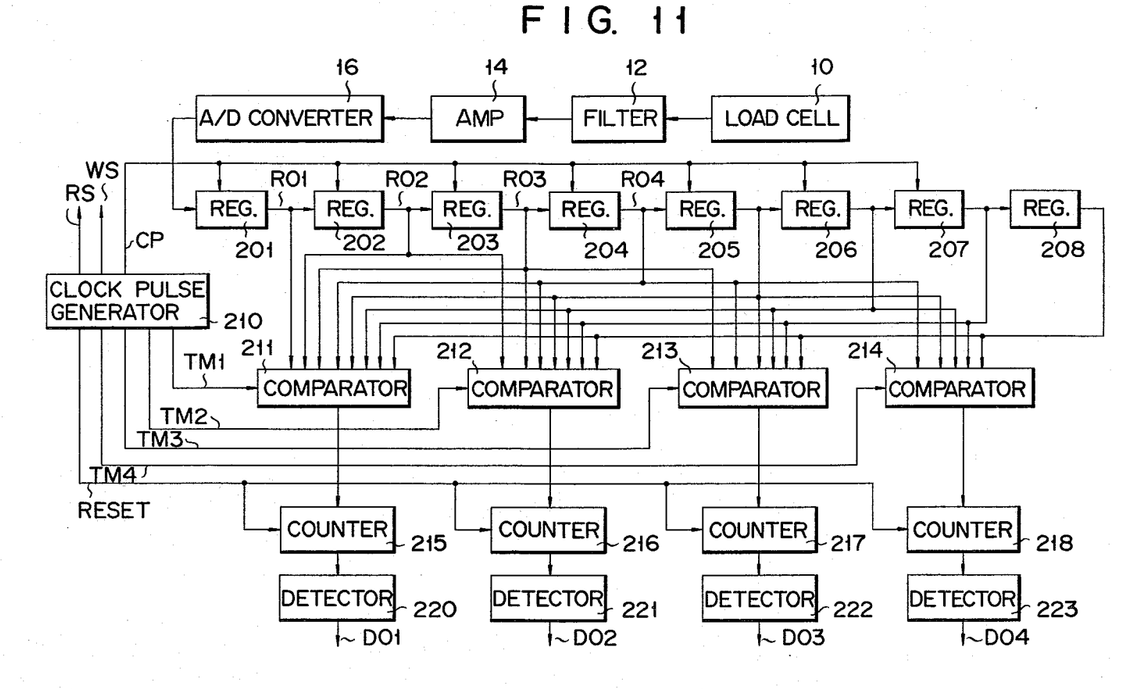
FIGS. 11 and 12 show logic circuits of still another embodiment of the weight measuring apparatus according to the invention.
Figure 12:
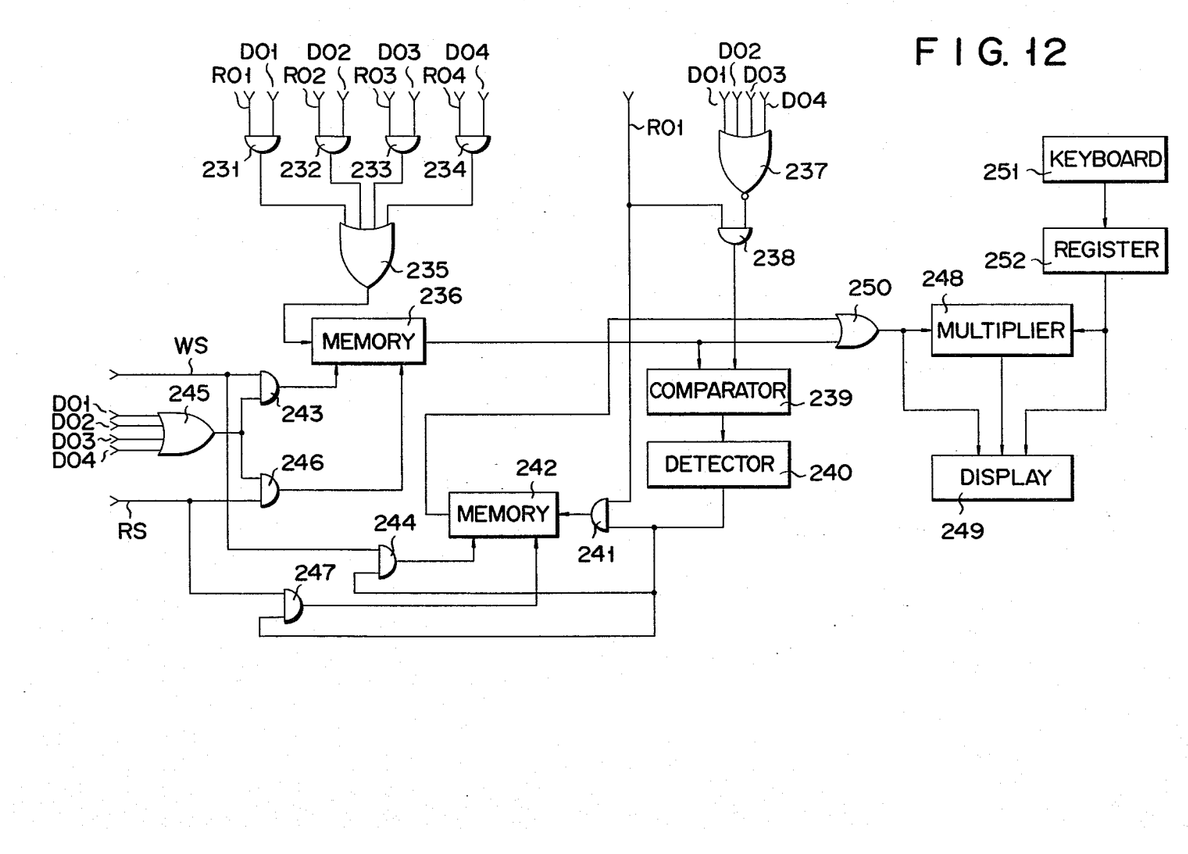

FIGS. 11 and 12 illustrate logic circuits to execute the data process shown in FIG. 5, which constitute another embodiment of the invention.

In FIG. 11, a load cell 10, a filter 12, an amplifier 14 and an A/D converter 16 are like those in FIG. 8. The A/D converter 16 produces a digital signal proportional to the weight of load applied to the load cell. The digital signal from the A/D converter 16 is applied to a shift register circuit constituted by eight shift registers 201 to 208. Responsive to a clock pulse signal CP from a timing/clock signal generator 210, the shift registers 201 to 208 respectively shift the stored data to the succeeding shift registers. The output data of the shift registers 201 to 208 are applied to a comparator 211; the output data of the shift registers 202 to 208 to a comparator 212; the output data of the shift registers 203 to 208 to a comparator 213; the output data of the shift registers 204 to 208 to a comparator 214. Responsive to a timing signal TM1 from the pulse generator 210, the comparator 211 successively compares an output data $R_{o1}$ of the shift register 201 with the output data of the shift registers 202 to 208. When the output data of the shift register 201 and one of the shift registers 202 to 208 are coincident to each other, a pulse is applied to a counter 215 from the comparator 211. Similarly, the comparators 212, 213 and 214, responsive to timing signals TM2, TM3 and TM4 from the pulse generator 210, successively compares the output data $R_{o2}$, $R_{o3}$ and $R_{o4}$ of the shift registers 202, 203 and 204 with the output data from other shift registers. Through the comparison, when concidence therebetween is detected, a pulse is applied to counter 216, 217 or 218 from the corresponding comparator. Count detectors 220 to 223 are coupled with the counters 215 to 218, respectively. When the contents of these counters 215 to 218 are 5 or more count, the count detectors produce high level-signals D01 to D04.

As shown in FIG. 12, high level output signals D01 to D04 from the count detectors 220 to 223 are supplied to AND gates 231 and 234, together with the output data $R_{o1}$ to $R_{o4}$ of the shift registers 220 and 223. That is, when the content of one of the counters 215 to 218 is five or more, a corresponding one of the AND gates 231 to 234 is enabled to permit one of output data $R_{o1}$ to $R_{o4}$ to be supplied to a memory 236 through an OR gate 235.

The output signals D01 to D04 of count detectors 220 to 223 are also supplied to a NOR gate 237. The output terminal of the NOR gate 237 is coupled with one input terminal of an AND gate 238. When the output signals of the count detectors 220 to 223 are all at low level, the AND gate 238 is enabled to permit the output data $R_{o1}$ of the shift register 201 to be fed to a comparator 239, via the AND 238. The comparator 239 compares the output data $R_{o1}$ transferred through the AND gate 238 with data stored in the memory 236, and feeds an output difference signal to a difference signal detector 240. The detector 240 produces a high level output signal when a difference signal from the comparator 237 is 5 or more count and enables the AND gate 241. As a result, the output data $R_{o1}$ from the shift register 201 is applied to a memory 242 through the AND gate 241 enabled. Memories 236 and 242 store input data when receiving a write signal WS from the pulse generator 210, via AND gates 243 and 244. The AND gate 243 is controlled by an OR gate 245 receiving output signals D01 to D04 from count detectors 220 to 223. When one of the output signals D01 to D04 is at high level, the AND gate 243 is enabled so that the write signal WS is applied to the memory 226. The AND gate 244 is controlled by an output signal of a detector 240, and is enabled, when the output signal of the detector 240 is at high level, to permit the write signal WS to be applied to the memory 242. To memories 226 and 242, is applied a read-out signal RS from the pulse generator 210 through AND gates 246 and 247, respectively, thereby to read out stored data from the memories. The AND gates 246 and 247 are controlled by the output signals of the OR gate 245 and a detector 240, as in the case of AND gates 243 and 244.

Data read out from the memories 236 or 242 responsive to a read-out signal RS from the pulse generator 210 is applies to a multiplier 248 and a weight display section (not shown) of a display unit 249, via an OR gate 250. To the other input terminal of the multiplier 248 is supplied the output data of a register 252 into which the unit price data is written by an operation of the kdyboard 251. The output unit price data of the register 252 is applied to a unit price display section (not shown) of the display unit 249. The multiplier 248 calculates amount data on the basis of the weight data and the unit price and applies it to an amount display section (not shown) of the display unit 249.

While the invention has been described by using specific embodiments, it is not limited to them but may be variously changed and modified.

For example, in the embodiments shown in FIGS. 1 to 4, eight sampled weight data are used; however, 4 to 7 or 9 or more weight data may be sampled and used as the sampled weight data.

The logic circuits in FIGS. 11 and 12 are constructed so as to execute the data process shown in FIG. 4. However, those may ready be so modified as to execute the data process shown in FIGS. 5, 6, 9 and 10.

What is claimed is:

1. A weight measuring method comprising:
   a first step of sensing the weight to be measured and successively generating a digital data signal corresponding to the weight to be measured;
   a second step of reading out the generated digital data signal at different timings and successively writing the same into a first memory;
   a third step of comparing N (integer larger than 3) digital data corresponding to N digital data signals successively stored in said first memory;
   a fourth step of, when it is detected (where M is an integer greater than 1 but less than N) that more than (M-1) number/of digital data in said N digital data have the same value, writing the digital data having the same value into a second memory;
   a fifth step of writing into said second memory the latest one of the digital data stored in said first memory when it is detected that the number of digital data having the same value fails to reach M; and
   a sixth step of reading out the digital data stored in said second memory as weight indication data.

2. A weight measuring method according to claim 1, in which said second memory includes a first memory section in which the digital data having the same value is stored in said fourth step and a second memory section in which said latest digital data is stored in said fifth step; and which further comprises a step of comparing said latest digital data stored in said second memory section of said second memory with digital data stored in said first memory section when it is detected that the digital data having the same value fails to reach M in the digital data stored in said first memory, and a step of selecting the digital data stored in said second memory section of said second memory as weight indication data when the difference between the compared digital data is more than a predetermined value and for selecting the digital data stored in said second memory section of said second memory as weight indication data when said difference is less than the predetermined value.

3. A weight measuring method according to claim 1 or 2, wherein said number M is greater than N/2 but less than N/2+2.

4. A weight measuring method according to claim 1 or 2, wherein said number M is greater than N/2−1 but less than N/2+1.

5. A weight measuring method comprising:
   a first step of sensing the weight to be measured and successively generating a digital data signal corresponding to the weight to be measured;
   a second step of reading out the generated digital data signal at different timings and successively writing the same to a first memory;
   a third step of comparing N (integer larger than 3) digital data corresponding to N digital data signals successively stored in said first memory;
   a fourth step of, when it is detected that more than M1−1) number (where M1 is an integer larger than 2 but less than N) of digital data in said N digital data have the same value, writing the digital data having the same value into a second memory;

a fifth step of, when it is detected that M2 (where M2 is an integer larger than 1 but less than M1) digital data in said N digital data have the same value, writing the digital data having the same value into said second memory;

a sixth step of, when it is detected that the number of digital data having the same value fails to reach M2 in said N digital data, writing into said second memory the latest one of the digital data stored in the first memory; and a seventh step of reading out the digital data stored in the second memory as weight indication data.

6. A weight measuring method according to claim 5, in which said second memory includes a first memory section into which digital data having the same value is written in said fourth step, and a second memory section into which the digital data with the same value obtained in the fifth step and the latest digital data obtained in the sixth step are selectively written; and which further comprises a step of comparing the digital data stored in the second memory section of said second memory with the digital data stored in said first memory section when it is detected that the number of digital data having the same value fails to reach M2 in said N digital data, and a step of selecting the digital data stored in said second memory section of said second memory is weight indication data when the difference between the compared digital data is greater than a predetermined value, and selecting the digital data stored in said second memory section of said second memory when the difference is less than the predetermined value.

7. A weight measuring method according to claim 5 or 6, wherein M2 is equal to (M1−1).

8. A weight measuring method according to claim 7, wherein when it is detected that plural groups of digital data having the same values are included in said N digital data, the digital data in the digital data group including the latest digital data in the digital data groups is written into said second memory.

9. A weight measuring method according to claim 5 or 6 wherein M2 is equal to (M1−2); and which further comprises a step of, when it is detected that (M1−1) digital data having the same value are included in said N digital data stored in said first memory, writing the digital data having the same value into said second memory.

10. A weight measuring method according to claim 9, wherein when it is detected that plural groups of digital data having the same values are included in said N digital data, the digital data in the digital data group including the latest digital data in the digital data groups is written into said second memory.

11. A weight measuring method according to claim 9, further comprising a step of generating a logic signal having first and second logic states; and a step of, when it is detected that (M1−1) digital data having the same value are included in the N digital data stored in said first memory, selectively writing the digital data having the same value into said first and second memories in accordance with said logic state of said logic signal.

12. A weight measuring method according to claim 5 or 6, wherein M2 is equal to (M1−1); and which further comprises a step of, when it is detected that, (M1−1) digital data having the same value are included in the N digital data, writing the digital data having the same value into said second memory; and a step of, when it is detected that (M1−2) digital data having the same value are included in the N digital data, writing the digital data having the same value into said second memory.

13. A weight measuring method according to claim 12, wherein when it is detected that plural groups of digital data having the same values are included in said N digital data, the digital data in the digital data group including the latest digital data in the digital data groups is written into said second memory.

14. A weight measuring method according to claim 5 or 6, wherein M2 is equal to (M1−1); and which further comprises a step of generating a logic signal having first and second logic states; and a step of, when it is detected that (M1−1) digital data having the same value are included in the N digital data stored in said first memory, selectively writing the digital data having the same value into said first and second memories in accordance with said logic state of said logic signal.

15. A weight measuring method according to claim 6, further comprising a step of generating a logic signal having first and second logic states; and a step in which when it is detected that the number of digital data having the same value fails to reach M1 in the digital data and said logic signal is in the first state, a read-out signal is applied to said second memory section of said second memory to read out weight indication data from said second memory section.

16. A weight measuring apparatus comprising:
weight detecting means for generating a digital data signal corresponding to the weight of load;
memory means having first and second memory sections;
data processing means which reads digital data signals out from said weight detecting means at different timings, successively writes the digital data signals into the first memory section of said memory means, compares the digital data stored in the first memory section with one another, writes the digital data having the same value into the second memory section when the number of digital data having the same value is not less than a predetermined number, writes the latest data stored in the first memory section of said memory means into said second memory section when the number of digital data having the same value is less than said predetermined number, and generates the digital data stored in said second memory section as weight indication data; and
display means for displaying the value of the weight indication data from said processing means.

17. A weight measuring apparatus according to claim 16, wherein said second memory section includes a first memory area into which one of the digital data having the same value is written when at least said predetermined number of digital data having the same value are included in the digital data stored in said first memory section, and a second memory area into which the latest digital data among a plurality of digital data stored in said first memory section is written when the number of digital data having the same value fails to reach the predetermined number; and said data processing means selectively provides an energizing signal to one of said first and second memory areas depending on whether or not the number of digital data having the same value among the digital data stored in said first memory section is less than said predetermined number.

18. A weight measuring apparatus according to claim 17, wherein said data processing means compares the digital data stored in said first and second memory areas of said second memory section when the number of digital data having the same value among the digital data stored in said first memory section is less than said predetermined number, energizes said first memory area when the result of the comparison shows that the difference between the compared digital data falls within a predetermined range, and energizes said second memory area when said comparison result shows that the difference falls outside said predetermined range.

19. A weight measuring apparatus comprising:
weight data generating means for generating digital data corresponding to the weight of load;
a plurality of first memories;
means for successively writing the digital data from said weight data generating means into said first memories;
first comparing means which compares the digital data stored in said first memories with one another, produces a first output signal when the result of the comparison shows that at least a predetermined number of digital data having the same value are included in the digital data stored in said first memories, and produces a second output signal, when the number of digital data having the same value is less than said predetermined number;
second and third memories;
means for writing into said second memory, responsive to the first output signal from said first comparing means, the digital data having the same value in the digital data stored in said first memories;
means for writing into said third memory, responsive to the second output signal from said first comparing means, the latest one of the digital data stored in said first memories; and
read-out means for reading out, responsive to the first and second output signals from said first comparing means, the digital data as weight indication data from said second and third memories, respectively.

20. A weight measuring apparatus according to claim 19, further comprising second comparing means which compares the latest one of the digital data stored in said first memories with the digital data stored in said second memory in response to the second output signal from said first comparing means and, when the difference between the digital data compared fails to reach a given value, prohibits the latest digital data from being written into said third memory.

21. A weight measuring apparatus according to claim 19 or 20, further comprising unit price setting means, multiplying means which receive at a first input terminal digital data from said second and third memories and at a second input terminal data from said unit price setting means and multiplies both the received data, and display means for displaying the value of an output data from said multiplying means.

* * * * *